(12) United States Patent
Luciani et al.

(10) Patent No.: US 12,450,238 B2
(45) Date of Patent: Oct. 21, 2025

(54) DATA STREAMING BETWEEN NODES OF A DATABASE SYSTEM

(71) Applicant: DataStax, Inc., Santa Clara, CA (US)

(72) Inventors: T Jake Luciani, Stanford, CT (US); Sergio Bossa, London (GB)

(73) Assignee: DataStax, Inc., Santa Clara, CA (US)

( * ) Notice: Subject to any disclaimer, the term of this patent is extended or adjusted under 35 U.S.C. 154(b) by 147 days.

(21) Appl. No.: 17/714,028

(22) Filed: Apr. 5, 2022

(65) Prior Publication Data
US 2022/0318252 A1    Oct. 6, 2022

Related U.S. Application Data

(60) Provisional application No. 63/171,478, filed on Apr. 6, 2021.

(51) Int. Cl.
| | | |
|---|---|---|
| *G06F 16/245* | (2019.01) | |
| *G06F 16/22* | (2019.01) | |
| *G06F 16/23* | (2019.01) | |
| *G06F 16/2455* | (2019.01) | |

(52) U.S. Cl.
CPC ........ *G06F 16/24568* (2019.01); *G06F 16/22* (2019.01); *G06F 16/2365* (2019.01)

(58) Field of Classification Search
CPC . G06F 16/24568; G06F 16/22; G06F 16/2365
See application file for complete search history.

(56) References Cited

U.S. PATENT DOCUMENTS

| | | | |
|---|---|---|---|
| 10,303,797 B1 * | 5/2019 | Menezes | G06F 16/1727 |
| 2007/0156842 A1 * | 7/2007 | Vermeulen | G06F 9/547 |
| | | | 709/217 |
| 2011/0258225 A1 * | 10/2011 | Taylor | G06F 16/2272 |
| | | | 707/769 |
| 2013/0318051 A1 * | 11/2013 | Kumar | G06F 16/137 |
| | | | 707/692 |
| 2015/0363135 A1 * | 12/2015 | Sinclair | G06F 12/0868 |
| | | | 711/103 |
| 2020/0045099 A1 * | 2/2020 | Naffati | H04L 67/06 |
| 2022/0114155 A1 * | 4/2022 | Dhuse | G06F 16/2379 |

OTHER PUBLICATIONS

Dageville, B. et al., "The Snowflake Elastic Data Warehouse," SIGMOD '16: Proceedings of the 2016 International Conference on Management of Data, Jun. 14, 2016, pp. 215-226.

Vuppalapati, M. et al., "Building An Elastic Query Engine on Disaggregated Storage," 17th USENIX Symposium on Networked Systems Design and Implementation, Feb. 25, 2020, pp. 449-462.

* cited by examiner

*Primary Examiner* — Jensen Hu
(74) *Attorney, Agent, or Firm* — Fenwick & West LLP

(57) ABSTRACT

A streaming operation is performed by nodes of cluster that implement a database. A method includes a first node determining data segments from data in a first data file stored at the first node for transfer to a second node of the cluster. The first node generates segment offset data for each data segment defining an offset position of the data segment relative to positions in the first data file. The first node transfers sets of segment data, each set including a data segment and the segment offset data for the data segment, to the receiving node. The second writes the data segments to a second data file stored at the second node by mapping each data segment to a position in the second data file as defined by the offset position in the segment offset data for the data segment.

20 Claims, 5 Drawing Sheets

300

Determine data segments from data in a database file for transfer to a receiving node of a cluster
302

Generate segment metadata for each data segment
304

Generate segment offset data for each data segment defining a start offset of the data segment relative to a data file that stores the data
306

Generate segment CRC data for each data segment defining a checksum value for the data segment
308

Generate a row index segment for each data segment
310

Transfer file metadata of the database file shared across the data segments to the receiving node
312

Transfer sets of segment data, each set including a data segment and segment metadata for the data segment, to the receiving node
314

Write the file metadata and the sets of segment data to a database file at the receiving node
316

FIG. 3

DATA STREAMING BETWEEN NODES OF A DATABASE SYSTEM

CROSS REFERENCE TO RELATED APPLICATIONS

This application claims a benefit of U.S. Patent Application Ser. No. 63/171,478, filed Apr. 6, 2021, the contents of which are incorporated by reference herein.

TECHNICAL FIELD

The disclosure generally relates to database in general and more specifically to transferring data between nodes of a database system.

BACKGROUND

Database systems, such as those using CASSANDRA, include a cluster of nodes that implement a distributed database. Each node of the cluster stores partitions of the database and processes read and write requests. The nodes exchange data contained in database files, such as sorted string tables (SSTables), using a process called streaming. Streaming may be used for operations such as database file repair, host replacement, range improvements, bootstrapping, rebuild, or cluster expansion. Streaming is a core bottleneck in database systems that becomes more difficult as node density increases.

SUMMARY

Embodiments relate to transferring data between nodes of a cluster of interconnected database nodes that implement a database. In some embodiments, a method includes determining, by a first node of the cluster, data segments from data in a first data file stored at the first node for transfer to a second node of the cluster. The method further includes generating, by the first node, segment offset data for each data segment defining an offset position of the data segment relative to positions in the first data file. The method further includes transferring, by the first node, sets of segment data, each set including a data segment and the segment offset data for the data segment, to the receiving node. The method further includes writing, by the second node, the data segments to a second data file stored at the second node by mapping each data segment to a position in the second data file as defined by the offset position in the segment offset data for the data segment.

Other embodiments include components, devices, systems, improvements, methods, processes, applications, computer readable mediums, and other technologies related to any of the above.

BRIEF DESCRIPTION OF THE DRAWINGS

FIG. 3 shows a flow chart of a process for performing a streaming operation from a sending node to a receiving node, in accordance with some embodiments.

DETAILED DESCRIPTION

Figure 1:
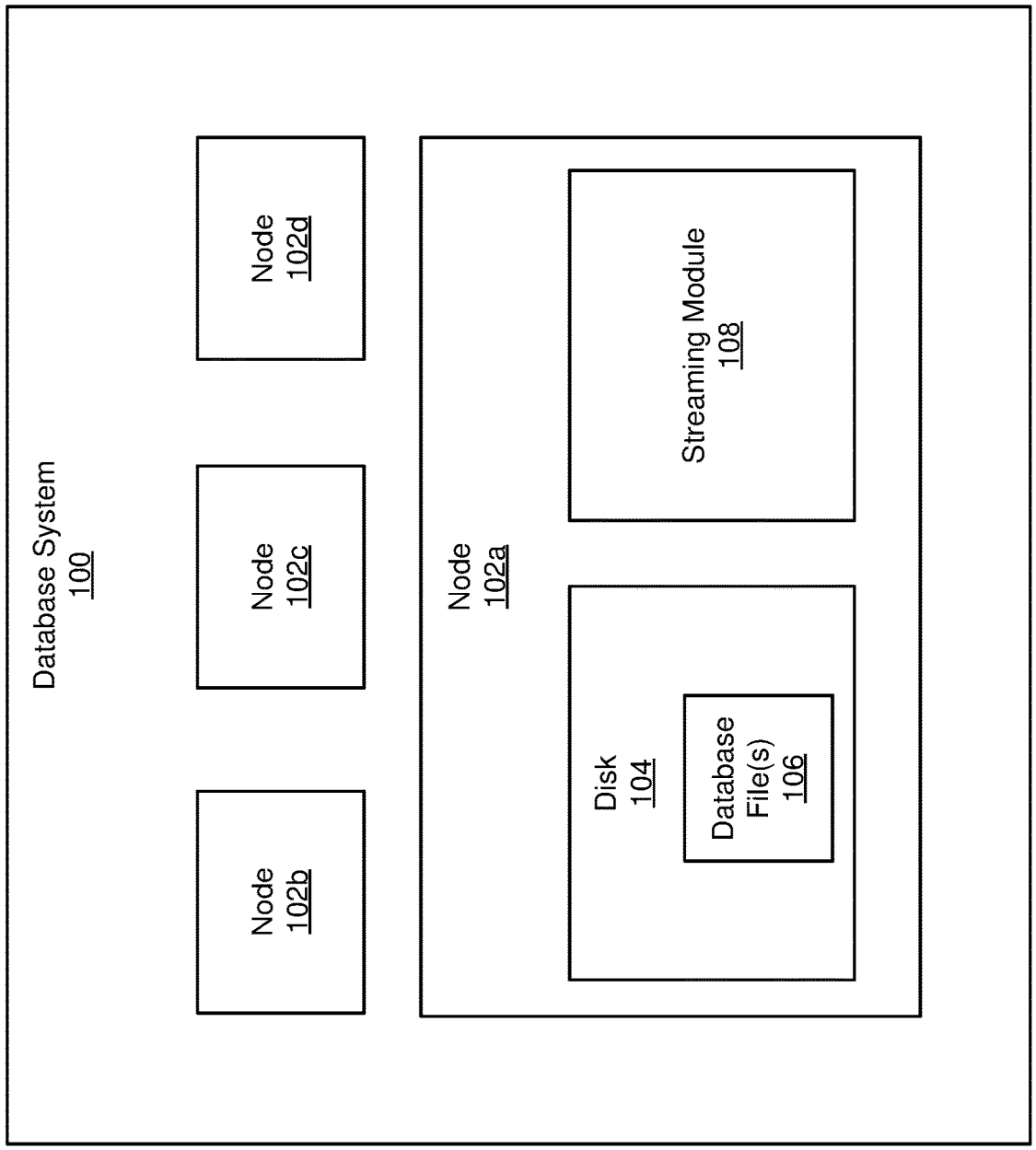
FIG. 1 shows a block diagram of a database system, in accordance with some embodiments.

Aspects of the present disclosure relate to transferring data between nodes of a database system. A streaming operation in database systems, such as those using CASSANDRA, includes a sending node transferring serialized data segments of a database file to a receiving node. The data is transferred without associated metadata. The receiving node deserializes the data segments, and recreates the metadata of the data file as the data segments are received. This results in low throughput of the streaming operation and heavy processing at the receiving node to recreate the metadata. The increased processing at the receiving node can impact the other workloads (e.g., read, write, flushing to database file, database file compaction, etc.) executing at the receiving node. It is also possible to stream an entire database file, including all of the data and the associated metadata, from the sending node to the receiving node. While streaming the entire database file removes the need to serialize/deserialize and recreate the metadata and thus decreases the required processing, the receiving node rarely needs the entire database file. For example, the receiving node may only need data that belongs to one or more partitions or virtual nodes (vnodes) that are assigned to the receiving node. As such, streaming the entire database file unnecessarily increases the volume of data transfer and may not increase the throughput of useful data transfer.

This disclosure relates to a high throughput and minimal processing approach to streaming selected data segments of a database file from a sending node to a receiving node. For example, the sending node streams data of a database file to the receiving node. The transferred data includes file metadata of the database file that is shared across all data segments, such as a bloom filter, compression block offsets, and partition index. A full copy of the file metadata is transferred one time for the streaming operation. The transferred data further includes sets of segment data for selected data segments. Each set of segment data includes a data segment and segment metadata for the data segment. The segment metadata may include segment offset data defining an offset position of the data segment relative to positions in the data file and segment cyclic redundancy check (CRC) data including a checksum value for the data segment. The segment metadata for a data segment may also include row index segment that maps cluster keys to rows within the data file that contain the data segment. Alternatively, a single copy of the entire row index may be transferred at one time along with the file metadata. At the receiving node, the file metadata and the sets of segment data are written to a database file. For example, transferred file metadata is written to the file metadata of the database file. The transferred data segments are written to the data file of the database file. The data segments may include compressed or uncompressed data. The transferred row index or transferred row index segments are written to the row index of the database file. The segment offset data is written to the metadata of the database file. The segment CRC data is written to the CRC data of the database file.

As a result, the streaming of selected database segments and associated metadata of a database file has increased throughput and minimal data processing. There is also no need to recreate metadata of the database file from the transferred data segments, or to transfer any unnecessary data segments. Streaming operations are improved with low impact on running workloads, no required user interface changes, and minimal disk impact (e.g., no more than 10% worse than streaming only data segments).

FIG. 1 shows a block diagram of a database system 100. The database system 100 includes a cluster of interconnected nodes including node 102a, node 102b, node 102c, and node 102d (individually referred to as node 102). The database system 100 is a distributed database that includes data spread among the nodes 102. Although four nodes 102 are shown, the database system 100 may include various numbers of nodes 102. Client computing devices interact with the database system 100 by communicating with any node 102 in the cluster. Each node 102 may work with other nodes 102 to perform operations as specified by the computing devices, such as read and write operations.

As shown for the node 102a, each node 102 includes a disk 104 that stores one or more database files 106 and a streaming module 108. In one example, the database system 100 uses the APACHE CASSANDRA database management system and each database file 106 is a sorted string table (SSTable). The database file 106 may be immutable such that it is not modified after data has been written to the database file 106. Each node 102 may own a set of partitions and each partition may include multiple data files 106. The disk 104 may be a persistent data storage that retains stored data even when power to the disk 104 is shut off.

The streaming module 108 performs streaming operations, which may include sending data to another node 102 and receiving data from another node 102. In a streaming operation, a sending node 102 transfers some or all the data contents in a database file 106 to a receiving node 102.

Figure 2A:
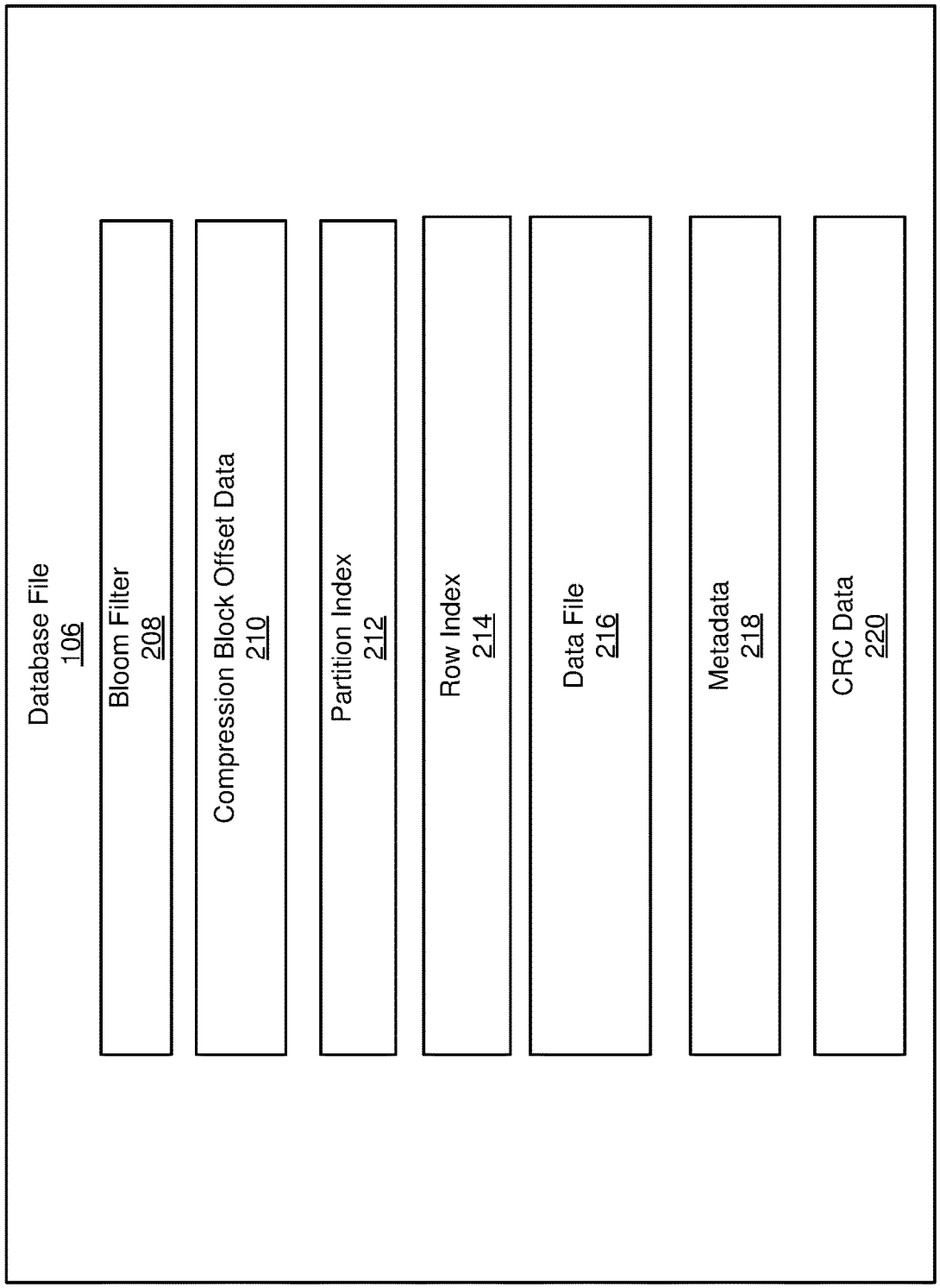
FIG. 2A shows components of a database file, in accordance with some embodiments.

FIG. 2A shows components of a database file 106. The database file 106 is a data structure for persisting database data on disk, such as an SSTable in Cassandra. The database file 106 includes multiple components including a bloom filter 208, compression block offset data 210, a partition index 212, a row index 214, a data file 216, metadata 218, and cyclic redundancy check (CRC) data 220. Each of these components may be stored on the disk 104 as a file of the database file 106.

The bloom filter 208 is used by the database system to determine whether the database file 106 is likely to contain data for a partition, without having to read the contents of the database file 106 using I/O operations. For a partition key, the bloom filter 208 is used to determine that the partition is not present in the database file, or that the database file is likely to contain the partition. Each database file 106 includes a bloom filter 208. In CASSANDRA, the bloom filter 208 is stored in a Filter.db file.

The compression block offset data 210 facilitates compression of the data in the data file 216 of the database file 106. Compression reduces the size of data 216 if the data file 216 on the disk 104. The compression block offset data 210 includes information regarding uncompressed data length, compression block size, and a list of compression block offsets. Compression may be performed by a node 102 when the data is written to the data file 216. For read operations, the node 102 locates a compression block using the compression block offset data 210 and decompress the compression block. In CASSANDRA, the compression block offset data is stored in a CompressionInfo.db file.

The partition index 112 facilitates locating data within the data file 216. In one example, the partition index 112 maps partition keys to positions (e.g., segments) of the row index 214 corresponding partitions of the data file 216, such as for data files 106 having wide partitions. Here, each partition key maps to a partition and a segment of the row index 214 that corresponds with the partition. In another example, the partition index points directly to positions (e.g., rows) of data in the data file 216, such as when the data file 106 includes partitions with a small number of rows. Here, the database file 106 does not include a row index 214. In some embodiments, the partition index 112 includes a trie data structure that uses unique byte-ordered key prefixes to point to the partitions and their row index segments or to data positions. In CASSANDRA, the partition index 112 is stored in a Partitions.db file.

The row index 214 map clustering keys to rows within the partitions in the database file 106. The row index 214 may be segmented by partition, with each segment of the row index 214 mapping to rows within one of the partitions. Each segment of the row index 214 may map a clustering key to a row within the partition. In CASSANDRA, the row index 214 is stored in a Rows.db file.

The data file 216 contains the data content of the database file 106. Data may be stored in rows of the data file 216. In CASSANDRA, the data file is stored in a Data.db file.

The metadata 218 includes information about the database file 106, including statistics, timestamps, tombstones, clustering keys, compaction, repair, compression, TTLs, etc. In CASSANDRA, the metadata may be stored in the Statistics.db file.

The CRC data 220 includes a checksum value for the data file 216. In CASSANDRA, the CRC data 220 may stored in the Digest.crc32 file.

Figure 2B:
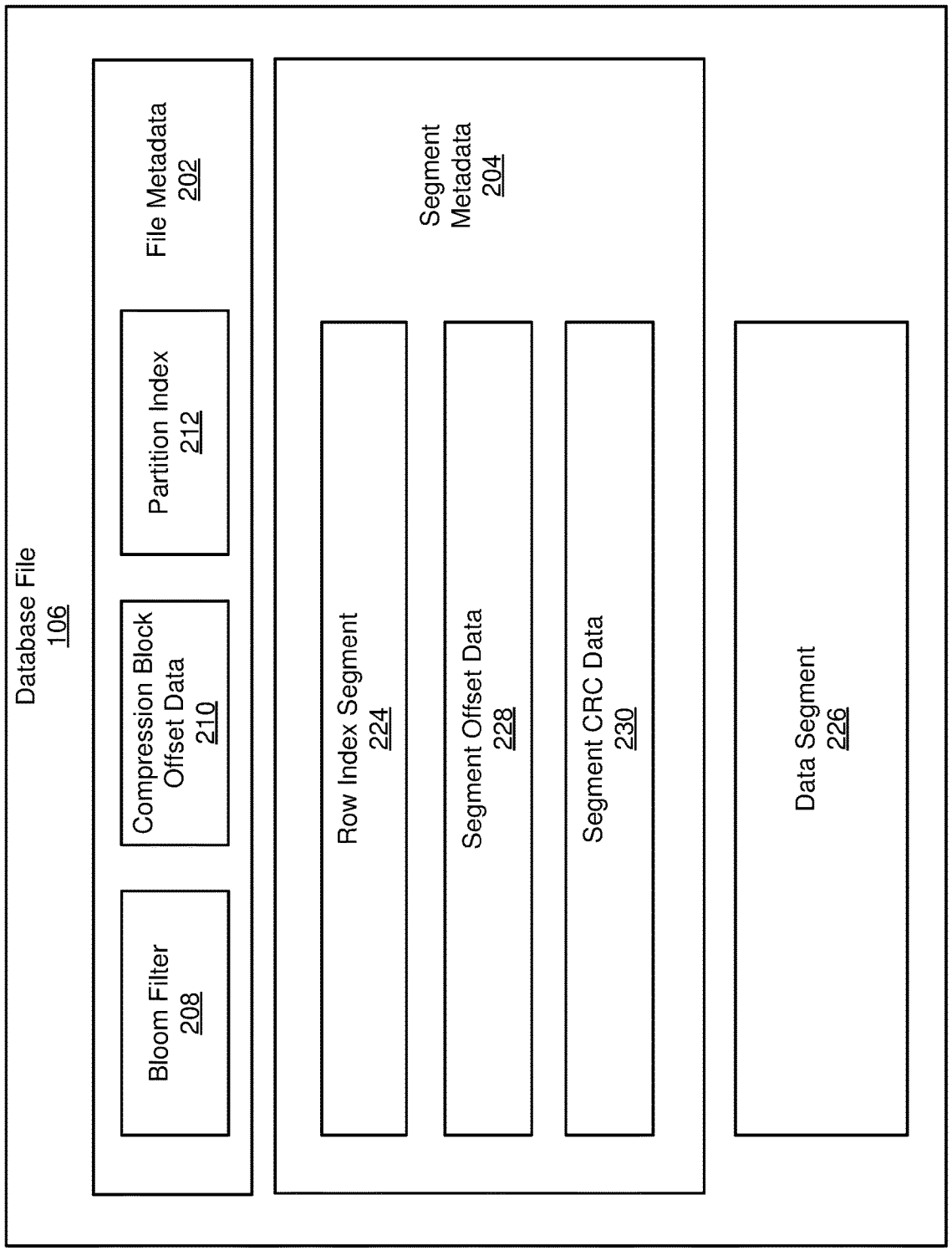
FIG. 2B shows components of a database file as modified for use in a streaming operation, in accordance with some embodiments.

FIG. 2B shows components of a database file 106 as modified for use in a streaming operation. Some or all of the data in the data file 216 may be transferred in data segments 226. The components that are transferred include file metadata 202, segment metadata 204, and data segment 226. The file metadata 202 includes shared components with information about the data file 216 that is shared across the data segments 226. The file metadata 202 includes the bloom filter 208, the compression block offset data 210, and the partition index 212.

The streaming operation may involve multiple instances of the segment metadata 204, each instance corresponding with one data segment 226. The segment metadata 204 for a data segment 226 includes a row index segment 224, segment offset data 228, and segment CRC data 220. In some embodiments, the row index 214 is a shared component across multiple data segments 226. The row index 214 is treated like a component of the file metadata 202 and is not separated into the row index segments 224.

The file metadata 202 may be fully transferred during the streaming operation. For example, no changes need to be made to the file metadata 202 by the sending node 102 prior to transmission to the receiving node 102. The sending node 102 sends one copy of each component of the file metadata 202 to the receiving node 102 that pertains to all of the data segments 226. For example, the bloom filter 208 spans all partitions and thus is not split into multiple components according to data segment. Although this may result in more false positives on reads when only some of the data in the data file 216 is streamed, this will be compacted away eventually. The partition index 212 may include offsets to partitions that do not exist in the database file 106 when only some of the data in the data file 216 is streamed, but these partitions may be avoided by using the segment offset data 228. When the partition index 212 uses the trie data structure, it is possible to prune out leaves from the partition index 212 corresponding with data segments or partitions that are not transferred. However, the complexity of the trie data structure approach may make this more difficult and not worth the tradeoff because the partition index 212 is already very compact.

The data in the data file 216 is separated into data segments 226 transmitted from the sending node 102 to the receiving node 102. Only some of the data segments 226 may be sent, such as the data segments belonging to a selected partition or multiple selected partitions. Alternatively, all the data segments 226 may be sent, such as to transfer the entire data file 216. The segment metadata 204 for each data segment 226 is transferred with the data segments 226 as a set of segment data during the streaming operation.

The row index 214 may be separated into row index segments 224 and transmitted with corresponding data segments. The row index 214 is segmented by partition, and thus can be separated into the row index segments 224 when data segments 226 are selected for transfer by partition. Alternatively, the entire row index 214 may be transmitted with the file metadata 202.

The segment offset data 228 defines for each data segment 226 a (e.g., start) offset position of the data segment relative to positions in the data file 216. The segment offset data 228 for a data segment 226 also includes the start and end partition bounds of the data segment. The partial offset data 228 accounts for compressed or uncompressed offsets. The segment offset data 228 may be generated by modifying the existing metadata 218 of the database file 106. For example, the metadata 218 may be separated into multiple instances of the segment offset data 228, with each instance of the segment offset data 228 pertaining to one data segment 226.

The segment CRC data 230 of each data segment 226 includes a checksum value for the data segment 226. The segment CRC data 230 may be generated by modifying the existing CRC data 220 of the database file 106. For example, the CRC data 220 may be separated into multiple instances of the segment CRC data 230, with each instance of the segment CRC data 230 pertaining to one data segment 226.

As such, each data segment 226 has associated metadata including a row index segment 224, segment offset data 228, and segment CRC data 230. For a streamlining operation, multiple sets of segment data may be transferred to from the sending node 102 to the receiving node 102, with each set of the segment data including the data segment 226 and the associated metadata.

At the receiving node 102, a database file 106 including the selected data segments 226 for the streaming operation is written to a disk 104 of the receiving node. The transferred data segments 226 may be written to a data file 216 at the receiving node 102. The transferred file metadata 202, including the bloom filter 208, the compression block offset data 201, and the partition index 212 at the receiving node, may be respectively written to a bloom filter 208, compression block offset data 210, and a partition index 212 of the database file 106 at the receiving node 102. The transferred row index segments 224 (or entire row index 214) may be written to a row index 214 of the database file 106 at the receiving node 102. The transferred segment offset data 228 may be written to the metadata 218 of the database file 106 at the receiving node 102. The transferred segment CRC data 230 may be written to CRC data 220 of the database file 106 at the receiving node 102. As such, the receiving node 102 does not need to reconstruct the bloom filter 208, the compression block offset data 210, the partition index 212, the row index 224, the metadata 218, or CRC data 220 from the received data segments 226.

FIG. 3 shows a flow chart of a process 300 for performing a streaming operation from a sending node 102 to a receiving node 102. The process 300 may include fewer or additional steps, and steps may be performed in different orders.

The streaming module 108 of a sending node 102 determines 302 data segments 226 from data in a database file 206 for transfer to a receiving node 102 of a cluster of nodes 102. The database file 206 may include a data file 226 that stores the data. The database file 206 further includes file metadata 202 regarding the data in the data file 226. The file metadata 202, including the bloom filter 208, the compression block offset 210, and the partition index 212, pertains to each of the data segments 226 and thus is shared across the data segments 226. The database file 206 also includes the metadata 218 and CRC data 220. In some embodiments, the file metadata 202 may further include the row index 214 that is not separated into multiple row index segments 224.

The data segments 226 to be transferred to the receiving node 102 in the streaming operation may be a subset of the data in the data file 216, such as data belonging to one or more partitions that represent a subset of the partitions in the database file 206. In another example, all the data in the data file 216 may be separated into data segments 226 for transfer in the streaming operation, such as when the entire database file 206 including all partitions is to be streamed to the receiving node 102.

The streaming module 108 of the sending node 102 generates 304 segment metadata 204 for each data segment 226. The segment metadata 204 for each data segment 226 includes information about the data segment 226 and is sent in connection with the corresponding data segment 226 in the streaming operation as a set of segment data. As such, the receiving node 102 does not need to recreate the segment metadata 204 for each data segment 226 as each data segment 226 is received from the sending node 102, thereby reducing the required processing at the receiving node 102.

To generate the segment metadata 204 for a data segment 226, the streaming module 108 of the sending node 102 may generate 306 segment offset data 228 for the data segment 226. The streaming module 108 of the sending node may generate 308 segment CRC data 230 for the data segment 226. The streaming module 108 of the sending node may generate 310 a row index segment 224 for the data segment 226.

The segment offset data 228 for each data segment 226 defines an (e.g., start) offset position of the data segment 226 relative to the positions in the data file 216. The segment offset data 228 for each data segment 226 also defines the partition bounds for the data segment 226. In some embodiments, the segment offset data 228 is generated by modifying the metadata 218 of the database file 106 to include the segment offset data 228 for each of the selected data segments 226. In some embodiments, the segment offset data 228 already exists in the metadata 218 and is separated by a data segment. In some embodiments, the segment offset data 228 represents new information that is generated for the data segments.

The segment CRC data 230 for each data segment 226 defines a checksum value for the data segment 226. In some embodiments, the segment CRC data 230 is generated by modifying the CRC data 220 of the database file 106 to include the segment CRC data 230 for each of the selected data segments 226. In some embodiments, the CRC data 230 already exists in the metadata 218 and is separated by a data segment. In some embodiments, the CRC data 230 represents new information that is generated for the data segments.

The row index segment 224 is a portion of the row index 214 of the database file 106 that pertains to the data segment 226. In some embodiments, generating the row index segment 224 includes separating the row index 214 by partition. Each row index segment 226 may map cluster keys to rows within the data file 216 that contain the data segment 226. The row index segments 224 are not used when the entire row index 214 is treated as file metadata 202.

The streaming module 108 of the sending node 102 transfers 312 the file metadata 202 to the receiving node 102. The streaming module 108 of the sending module 108 also transfers 314 sets of segment data, each set including a data segment 226 and the segment metadata 204 for the data segment 226, to the receiving node 102. For example, the streaming module 108 of the sending node 102 generates an outgoing message that includes the file metadata 202 (which are transferred only once for the streaming operation rather than with each data segment), and the sets of segment data, each set including a data segment 226 and the respective segment metadata 204 for the data segment 226.

The streaming module 108 of the receiving node 102 writes the file metadata 202 and the sets of segment data to a database file 106 stored at the receiving node 102. The new database file 106 may be stored in a disk 104 of the receiving node 102. Writing the transferred file metadata 202 to the database file 106 may include writing the transferred bloom filter 208, transferred compression block offset data 210, and transferred partition index 212 to the database file 106. Writing the data segments to the database file 106 may include mapping each data segment 226 to a position in the data file 216 as defined by the segment offset data 228. For each data segment 226 that is streamed, the file offset to the start of the data segment 226 is included in the segment offset data 228, as well as the start and end partition in the data range of the data segment 226. The streaming module 108 of the receiving node 102 uses the segment offset data 228 (when it exists) to make the data segment 226 appear like it's still in the data file 216. This is primarily so index locations can map to the same locations of the data file 216 as in the database file 106 at the sending node 106. The partition bounds defined by the segment offset data 228 for each data segment 226 is also stored in the reconstructed database file 106 at the receiving node 102 and used to ignore lookups to partitions outside of the data segment on reads of the reconstructed database file 106.

The segment CRC data 230 for each data segment 226 may be used by the receiving node 102 to check the data segment 226 for errors caused by the data transfer in the streaming operation. A data segment 226 with errors may be retransferred from the sending node 102 to the receiving node 102, either by itself or along with the segment metadata 204 for the data segment 226. In some embodiments, the segment CRC data 230 is stored in reconstructed CRC data 220 of the reconstructed database file 106.

Each row index segment 224 is written to the row index 214 of the database file 216 at the receiving node 102. As such, the row index 214 at the receiving node 102 can map cluster keys to rows containing the transferred data segments 226.

The file metadata 202 is hard linked to each set of segment data by the receiving node 102. This allows the streaming module 108 of the receiving node 102 to treat the one copy of the file metadata 202 as many different files without requiring the use of extra storage space for duplicate copies. According to some embodiments, the system streams the shared components followed by the partial components and creates a hard link from the partial component to the shared component so that the operating system treats the shared component as many different files without actually making copies of the shared components.

In some embodiments, the streaming operation may operate differently based on the relative data sizes of the metadata components and the data file 216 in the database file 106. For example, if there is much more metadata (e.g., 100 M of index) than data (e.g., 10 M) then only the data segments may be transferred from the sending node 102 to the receiving node 102. At the receiving node, the metadata components may be generated from the data segments.

Figure 4:
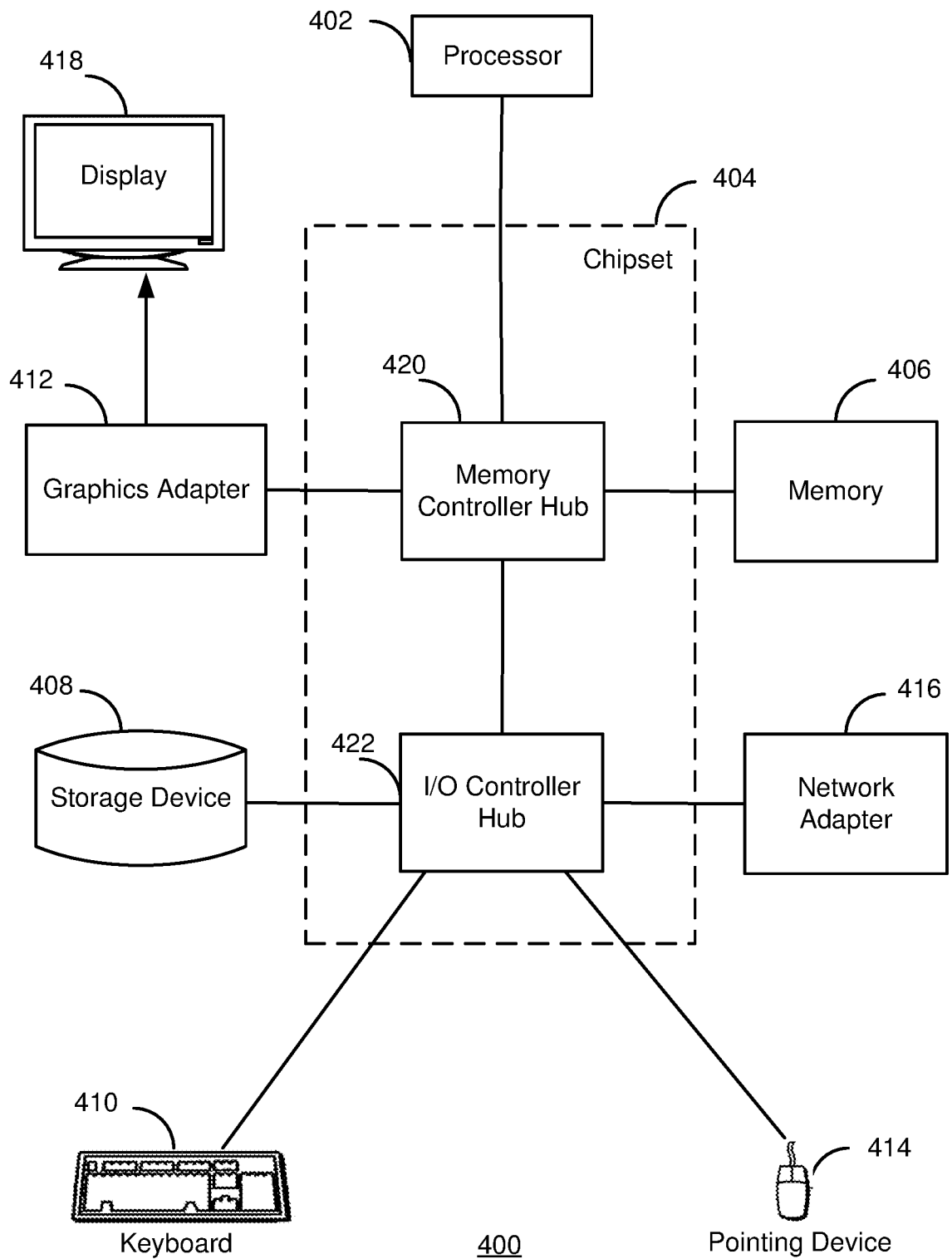
FIG. 4 is a schematic block diagram of a computer used in the database system, in accordance with some embodiments.

FIG. 4 is a schematic block diagram of a computer 400, according to one embodiment. The computer 400 is an example of circuitry that implements components of the database system 100, such as each of the nodes 102. Illustrated are at least one processor 402 coupled to a chipset 404. The chipset 404 includes a memory controller hub 420 and an input/output (I/O) controller hub 422. A memory 406 and a graphics adapter 412 are coupled to the memory controller hub 420, and a display device 418 is coupled to the graphics adapter 412. A storage device 408, keyboard 410, pointing device 414, and network adapter 416 are coupled to the I/O controller hub 422. Other embodiments of the computer 400 have different architectures. For example, the memory 406 is directly coupled to the processor 402 in some embodiments.

The storage device 408 includes one or more non-transitory computer-readable storage media such as a hard drive, compact disk read-only memory (CD-ROM), DVD, or a solid-state memory device. The memory 406 holds instructions and data used by the processor 402. The pointing device 414 is used in combination with the keyboard 410 to input data into the computer system 400. The graphics adapter 412 displays images and other information on the display device 418. In some embodiments, the display device 418 includes a touch screen capability for receiving user input and selections. The network adapter 416 couples the computer system 400 to a network. Some embodiments of the computer 400 have different and/or other components than those shown in FIG. 4.

The computer 400 is adapted to execute computer program modules for providing functionality described herein. For example, some embodiments may include a computing device including one or more modules configured to perform the process 300 shown in FIG. 3. As used herein, the term "module" refers to computer program instructions and/or other logic used to provide the specified functionality. Thus, a module can be implemented in hardware, firmware, and/or software. In one embodiment, program modules formed of executable computer program instructions are stored on the storage device 408, loaded into the memory 406, and executed by the processor 402.

Additional information regarding data streaming between nodes of a database system are discussed in APPENDIX: Zero Copy Streaming Design.

Throughout this specification, plural instances may implement components, operations, or structures described as a single instance. Although individual operations of one or more processes are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium or in a transmission signal) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the processes described herein may be at least partially processor-implemented. For example, at least some of the operations of a process may be performed by one or more processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Upon reading this disclosure, those of skill in the art will appreciate still additional alternative structural and functional designs for a system and a process for data transfer between database nodes through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

Finally, the language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A method, comprising:
   determining, by a first node of a cluster of interconnected database nodes that implement a database, data segments from data in a first data file stored at the first node for transfer to a second node of the cluster for a database operation to be performed on the second node, wherein the data segments represent a subset of database data stored in the first data file;
   extracting, by the first node, file metadata of the first data file that is about the first data file;
   transferring, by the first node, the file metadata of the first data file to the second node;
   generating, by the first node, segmentation metadata for each data segment that is about a corresponding data segment, segment metadata including segment offset data for each data segment defining an offset position of the data segment relative to positions in the first data file;
   transferring, by the first node, sets of segment data, each set including a data segment and the segment metadata for the data segment, to the second node;
   writing, by the second node, the set of segment data received from the first node to a second data file stored at the second node based on received file metadata, data segments, and corresponding segment metadata, writing the sets of segment data comprising:
      generating, by the first node and for each data segment, a row index segment mapping cluster keys to rows within the first data file that contain the data segment, wherein each set of the sets of segment data transferred to the second node further includes the row index segment of the data segment; and
      writing, by the second node, the row index segment for each of the data segments to a row index of a database file stored at the second node; and
   performing the database operation on the set of segment data stored in the second data file.

2. The method of claim 1, wherein the data segments transferred to the second node represent a subset of the data in the first data file.

3. The method of claim 1, further comprising:
generating, by the first node and for each data segment, segment cyclic redundancy check (CRC) data including a checksum value for the data segment, wherein each set of the sets of segment data transferred to the second node further includes the segment CRC data of the data segment; and
writing, by the second node, the segment CRC data for each of the data segments to CRC data of a database file stored at the second node.

4. The method of claim 1, wherein the segment offset data for each data segment further defines partition bounds for each data segment.

5. The method of claim 1, wherein:
the first data file is part of a first database file that further includes file metadata regarding the data; and
the method further includes:
transferring, by the first node, the file metadata to the second node; and
writing, by the second node, the file metadata to a second database file stored at the second.

6. The method of claim 5, wherein the file metadata includes a bloom filter.

7. The method of claim 5, wherein the file metadata includes a partition index.

8. The method of claim 5, wherein the file metadata includes compression block offset data defining an uncompressed data length, a compression block size, and a list of compression block offsets.

9. The method of claim 5, wherein the file metadata includes a row index.

10. The method of claim 1, wherein at least one data segment is compressed.

11. A non-transitory computer readable storage medium storing instructions that when executed by one or more computer processors cause the one or more computer processors to perform steps comprising:
determining, by a first node of a cluster of interconnected database nodes that implement a database, data segments from data in a first data file stored at the first node for transfer to a second node of the cluster for a database operation to be performed on the second node, wherein the data segments represent a subset of database data stored in the first data file;
extracting, by the first node, file metadata of the first data file that is about the first data file;
transferring, by the first node, the file metadata of the first data file to the second node;
generating, by the first node, segmentation metadata for each data segment that is about a corresponding data segment, segment metadata including segment offset data for each data segment defining an offset position of the data segment relative to positions in the first data file;
transferring, by the first node, sets of segment data, each set including a data segment and the segment metadata for the data segment, to the second node;
writing, by the second node, the set of segment data received from the first node to a second data file stored at the second node based on received file metadata, data segments, and corresponding segment metadata, writing the sets of segment data comprising:
generating, by the first node and for each data segment, a row index segment mapping cluster keys to rows within the first data file that contain the data segment, wherein each set of the sets of segment data transferred to the second node further includes the row index segment of the data segment; and
writing, by the second node, the row index segment for each of the data segments to a row index of a database file stored at the second node; and
performing the database operation on the set of segment data stored in the second data file.

12. The non-transitory computer readable storage medium of claim 11, wherein the data segments transferred to the second node represent a subset of the data in the first data file.

13. The non-transitory computer readable storage medium of claim 11, wherein the instructions cause the one or more processors to further perform steps comprising:
generating, by the first node and for each data segment, segment cyclic redundancy check (CRC) data including a checksum value for the data segment, wherein each set of the sets of segment data transferred to the second node further includes the segment CRC data of the data segment; and
writing, by the second node, the segment CRC data for each of the data segments to CRC data of a database file stored at the second node.

14. The non-transitory computer readable storage medium of claim 11, wherein the segment offset data for each data segment further defines partition bounds for each data segment.

15. The non-transitory computer readable storage medium of claim 11, wherein:
the first data file is part of a first database file that further includes file metadata regarding the data; and
the instructions further cause the one or more processors to perform steps comprising:
transferring, by the first node, the file metadata to the second node; and
writing, by the second node, the file metadata to a second database file stored at the second node.

16. A computer system comprising:
one or more computer processors; and
a non-transitory computer readable storage medium storing instructions that when executed by the one or more computer processors cause the one or more computer processors to perform steps comprising:
determining, by a first node of a cluster of interconnected database nodes that implement a database, data segments from data in a first data file stored at the first node for transfer to a second node of the cluster for a database operation to be performed on the second node, wherein the data segments represent a subset of database data stored in the first data file;
extracting, by the first node, file metadata of the first data file that is about the first data file;
transferring, by the first node, the file metadata of the first data file to the second node;
generating, by the first node, segmentation metadata for each data segment that is about a corresponding data segment, segment metadata including segment offset data for each data segment defining an offset position of the data segment relative to positions in the first data file;
transferring, by the first node, sets of segment data, each set including a data segment and the segment metadata for the data segment, to the second node;
writing, by the second node, the set of segment data received from the first node to a second data file stored at the second node based on received file metadata, data segments, and corresponding segment metadata, writing the sets of segment data comprising:
   generating, by the first node and for each data segment, a row index segment mapping cluster keys to rows within the first data file that contain the data segment, wherein each set of the sets of segment data transferred to the second node further includes the row index segment of the data segment; and
   writing, by the second node, the row index segment for each of the data segments to a row index of a database file stored at the second node; and
   performing the database operation on the set of segment data stored in the second data file.

17. The computer system of claim 16, wherein the instructions cause the one or more processors to further perform steps comprising:
   generating, by the first node and for each data segment, a row index segment mapping cluster keys to rows within the first data file that contain the data segment, wherein each set of the sets of segment data transferred to the second node further includes the row index segment of the data segment; and
   writing, by the second node, the row index segment for each of the data segments to a row index of a database file stored at the second node.

18. The computer system of claim 16, wherein the instructions cause the one or more processors to further perform steps comprising:
   generating, by the first node and for each data segment, segment cyclic redundancy check (CRC) data including a checksum value for the data segment, wherein each set of the sets of segment data transferred to the second node further includes the segment CRC data of the data segment; and
   writing, by the second node, the segment CRC data for each of the data segments to CRC data of a database file stored at the second node.

19. The computer system of claim 16, wherein writing the sets of segment data comprising:
   for each set of segment data received from the first node,
      mapping a corresponding data segment to a position in the second data file as defined by the offset position in the corresponding segment offset data for the data segment; and
      storing the corresponding data segment at the mapped position in the second data file on the second node.

20. The method of claim 1, wherein writing the sets of segment data comprising:
   for each set of segment data received from the first node,
      mapping a corresponding data segment to a position in the second data file as defined by the offset position in the corresponding segment offset data for the data segment; and
      storing the corresponding data segment at the mapped position in the second data file on the second node.

* * * * *